US011080624B2

(12) United States Patent
Wald

(10) Patent No.: US 11,080,624 B2
(45) Date of Patent: Aug. 3, 2021

(54) APPLICATION PROGRAMMING INTERFACE FOR A LEARNING CONCIERGE SYSTEM AND METHOD

(71) Applicant: VISA INTERNATIONAL SERVICE ASSOCIATION, San Francisco, CA (US)

(72) Inventor: Jerry Wald, San Francisco, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 546 days.

(21) Appl. No.: 15/723,767

(22) Filed: Oct. 3, 2017

(65) Prior Publication Data

US 2019/0102707 A1 Apr. 4, 2019

(51) Int. Cl.

| G06Q 10/02 | (2012.01) |
| G06Q 10/10 | (2012.01) |
| G06Q 30/06 | (2012.01) |
| G06F 16/28 | (2019.01) |
| G06N 7/00 | (2006.01) |
| G06N 20/00 | (2019.01) |
| G06N 3/04 | (2006.01) |

(52) U.S. Cl.
CPC .......... *G06Q 10/02* (2013.01); *G06F 16/285* (2019.01); *G06Q 10/107* (2013.01); *G06Q 10/1093* (2013.01); *G06Q 30/0631* (2013.01); *G06N 3/0445* (2013.01); *G06N 7/005* (2013.01); *G06N 20/00* (2019.01)

(58) Field of Classification Search
None
See application file for complete search history.

(56) References Cited

U.S. PATENT DOCUMENTS

| 8,930,820 | B1 | 1/2015 | Elwell | |
| 2006/0200374 | A1 | 9/2006 | Nelken | |
| 2006/0241859 | A1* | 10/2006 | Kimchi | G01C 21/26 701/532 |
| 2008/0162259 | A1* | 7/2008 | Patil | G06Q 30/02 705/7.29 |
| 2009/0228321 | A1* | 9/2009 | Srinivasan | G06Q 10/109 705/7.19 |
| 2010/0125510 | A1 | 5/2010 | Smith | |
| 2014/0114705 | A1* | 4/2014 | Bashvitz | G06Q 10/047 705/5 |
| 2014/0136373 | A1 | 5/2014 | Kinsey, II | |
| 2014/0136443 | A1* | 5/2014 | Kinsey, II | G06Q 10/063116 705/347 |
| 2015/0347982 | A1 | 12/2015 | Jon | |
| 2015/0371155 | A1* | 12/2015 | Saint-Just | G06Q 10/02 705/5 |

* cited by examiner

*Primary Examiner* — Tonya Joseph
(74) *Attorney, Agent, or Firm* — Loeb & Loeb, LLP

(57) ABSTRACT

The described system and method reviews past receipts from purchases and past purchase patterns and, in response to a request, returns a recommendation about future scheduling or future purchases.

18 Claims, 5 Drawing Sheets

APPLICATION PROGRAMMING INTERFACE FOR A LEARNING CONCIERGE SYSTEM AND METHOD

BACKGROUND

As people become more busy, trying to manage activities becomes more and more challenging. In the past, people would use calendars or date books to keep track of appointments. More recently, electronic devices have helped people track activities in a similar manner to manual date books. While electronic devices have amazing capabilities, the capability to review past data to predict and assist in future scheduling has been extremely limited.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

The described system and method reviews past receipts from purchases and past purchase patterns and, in response to a request, returns a recommendation about future scheduling or future purchases. The system may review data from a plurality of sources and execute learning algorithms against the data to create recommendations. The recommendations may be analyzed in view of events that are already scheduled to determine recommendation times that do not have conflict or have conflicts with events which have been determined to be of a lower priority. The concierge logic may be extended to purchases of goods based on recommendations of the user or of similar users.

Figure 1:
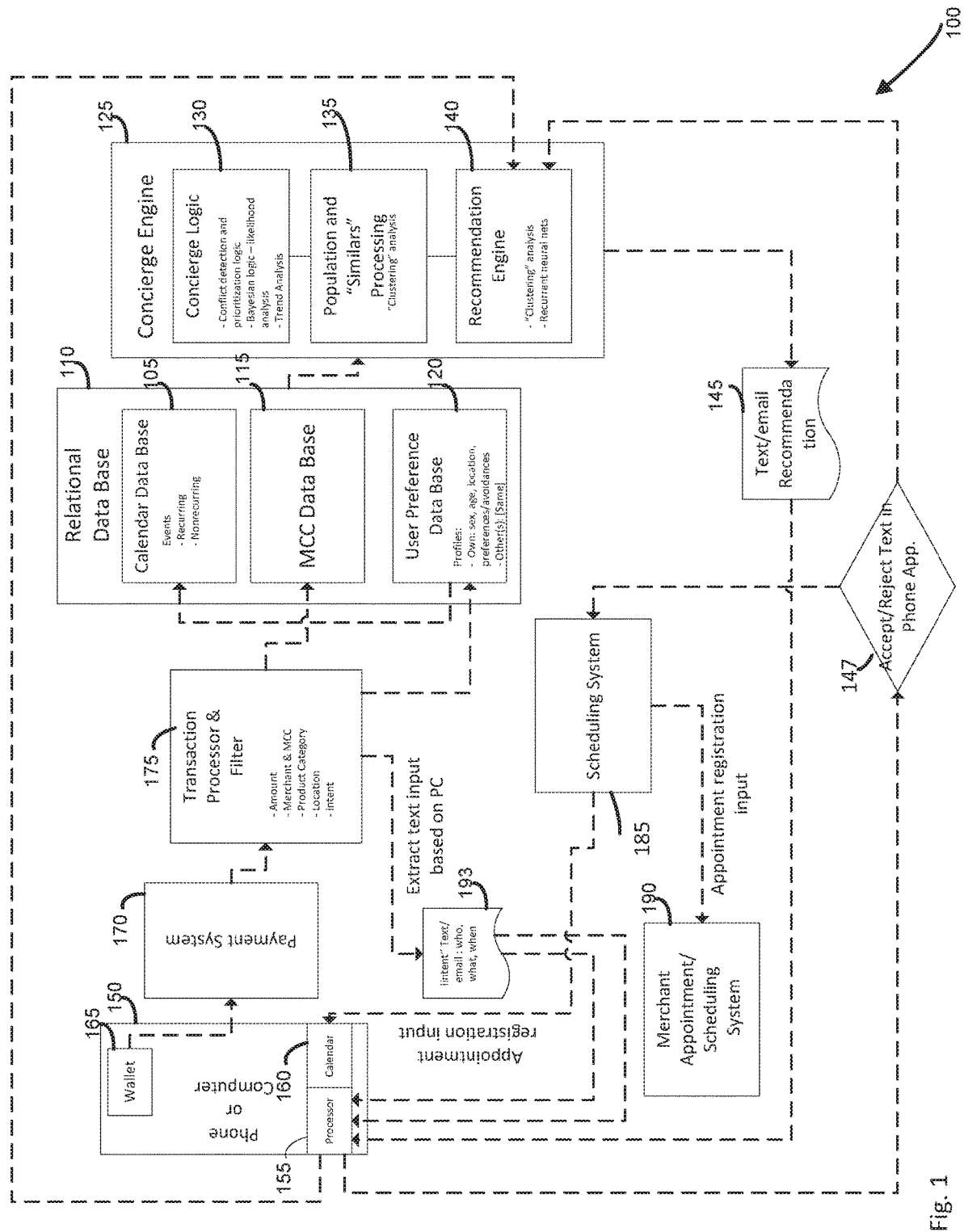
FIG. 1 may be an illustration of one embodiment of the data flows through the computing systems described in the claims.

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

SPECIFICATION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description is, therefore, not to be taken in a limiting sense.

Figure 2:
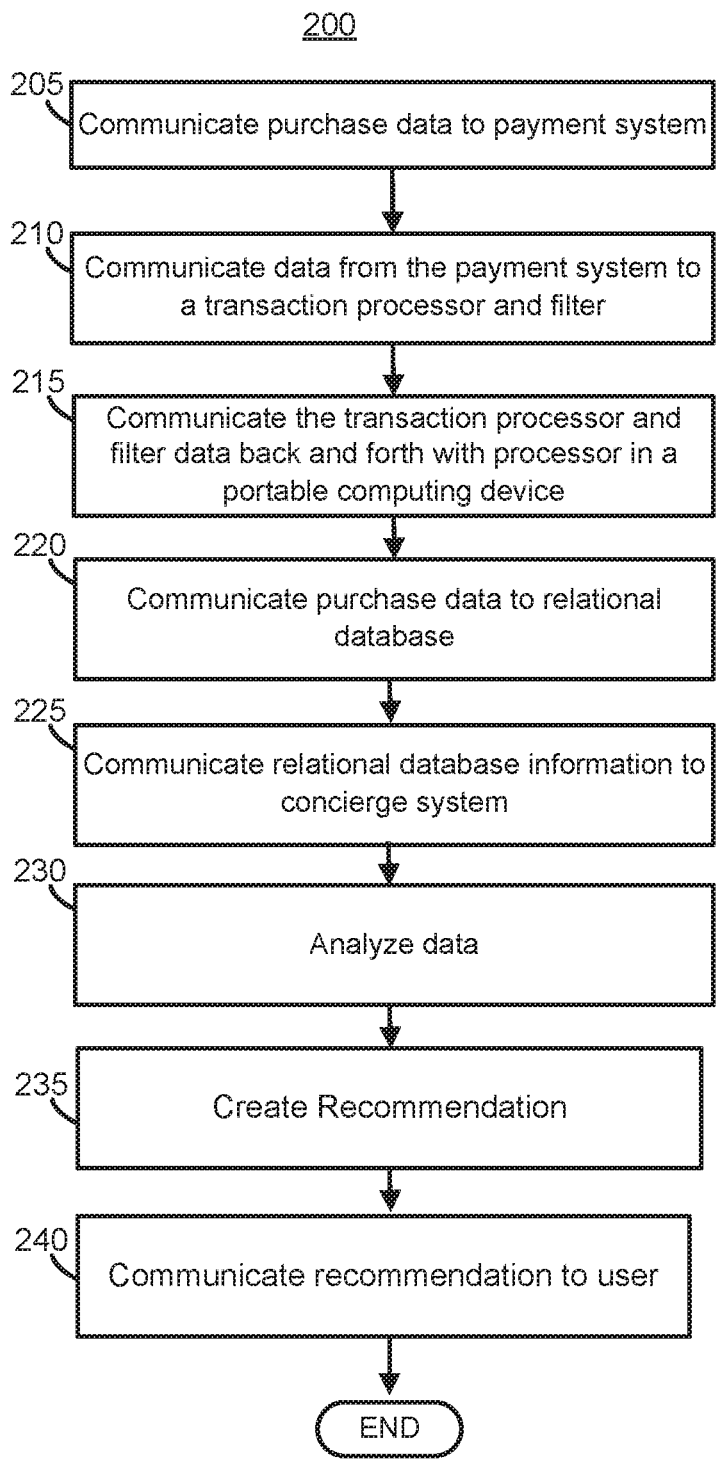
FIG. 2 may be an illustration of a method in accordance with the claims.
Figure 3:
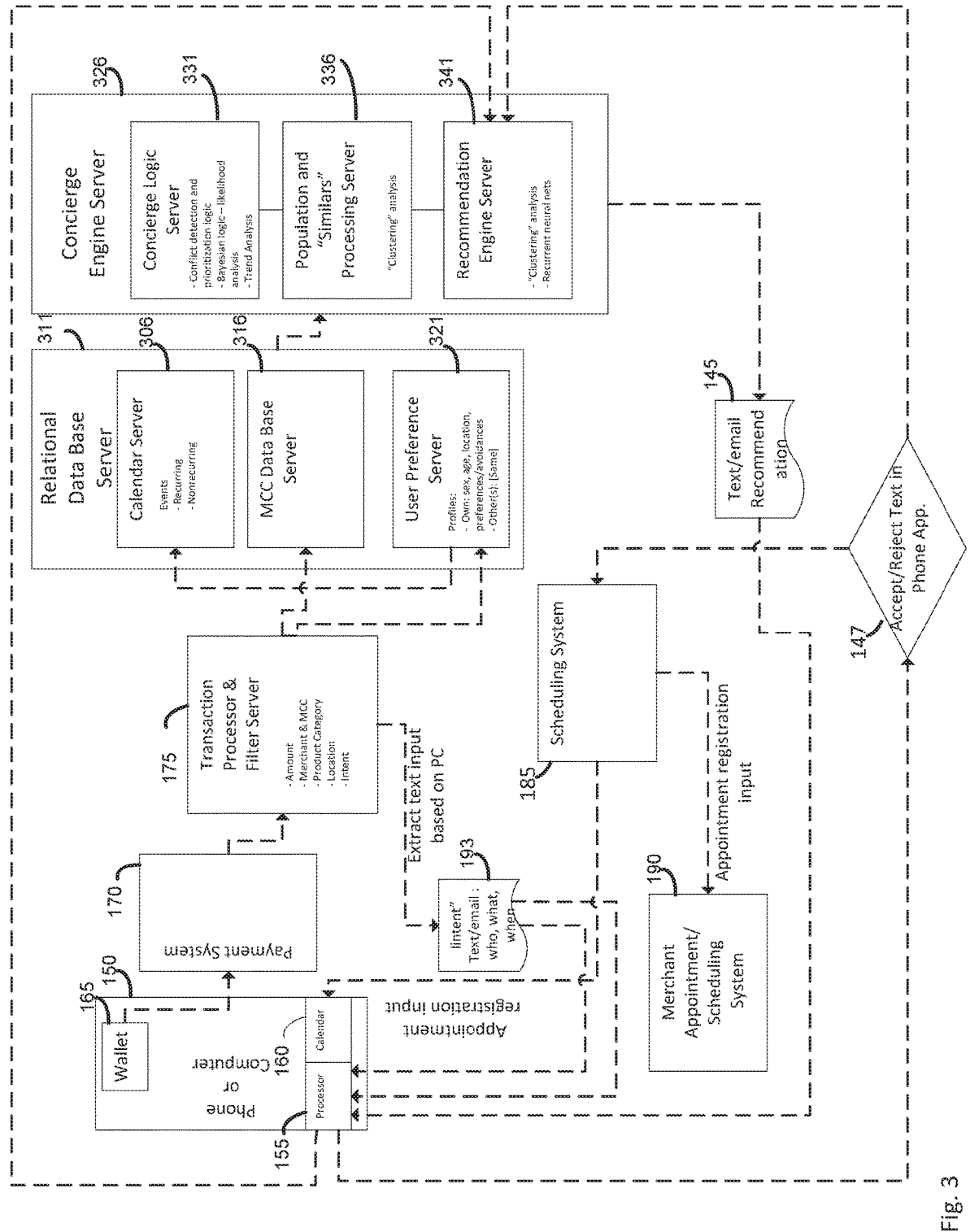
FIG. 3 may be an illustration of computing devices in accordance with the claims.

A system and method for concierge processing is disclosed. At a high level, the concierge processing system and method uses machine learning to determine patterns of behaviors and create recommendations for schedules, purchases and the like. FIG. 1 may illustrate data flows through the system and FIG. 2 may illustrate blocks of computer executable instructions that may be performed by the various equipment illustrated in FIG. 1. FIG. 3 may be similar to FIG. 1 but may illustrate that many of the blocks may be purpose built computing devices or servers.

At block 205, purchase data may be communicated to payment system 170. A payment system 170 may be an electronic computer network and parties on the network may review transactions for authenticity and arrange for an efficient exchange of funds.

The payment system 170 may vary widely depending on the payment device used. In some embodiments, the payment device used in the payment system 170 may be a traditional credit card which may follow a traditional transaction path. In other embodiments, the payment device may be an electronic wallet 165 which may use token to represent personal account numbers rather than communicating the actual account numbers. The wallet 165 may contain one or more payment accounts and one or more may be selected to make a payment or transfer. In other embodiments, the payment device may be a wearable that contains information that may be used to enable a transaction either alone or in concert with a portable computing device 150.

At block 210, data from the payment system 170 may be communicated to a transaction processor and filter 175. The transaction processor and filter server 175 may review data from the payment system 170 and may remove data which may be useful for the concierge system. For example, the system may remove the amount of the transaction, the merchant identification and the merchant category code, the product category, the merchant location and the intent of the transaction. Other information may be removed or added from other sources as needed or as available.

The decision on what information to remove may be based on an algorithm. The algorithm may take into account a variety of factors in determining the data to be removed. In some situations, user permissions may be required before some of the data is removed as the data may be potentially sensitive. In other situations, some of the data may be determined to not be useful and it may be more efficient to not collect such information.

In addition, at block 215, the transaction processor and filter 175 may communicate data back and forth with a processor 155 in a portable computing device 150 of a user. The filter 175 may extract useful text from the payment data which may be useful for a concierge such as a who, a what and a when of a transaction or a proposed appointment. The data may be communicated to a user like a receipt 193 or confirmation of a transaction. The receipt 193 may be communicated to a user as a memorial of a purchase similar to a paper receipt in the past. The receipt 193 may be provided in a variety of electronic formats compatible with the portable computing device 150 such as a text message, an email message, a pop up in the payment app, as a tab in the payment app, as a banner on the payment app, etc.

In some embodiments, the format of the electronic communication may be selected by the merchant. For example, a merchant may desire that the electronic receipt have a specific format that may be recognizable to many users such as a trademarked logo or it may have a recognizable sound or recognizable haptic feedback. Logically, the type of electronic receipt may depend on the type of message being communicated and device receiving the receipt.

In other embodiments, the user may select the format of the receipt 193. The available options may be selected by the user from a plurality options. The options may be dependent on the portable computing device being used by the user. For example, a portable computing device without a color display may not allow the display of color receipts. As another example, the receipt 193 may be communicated to a receipt app, to the wallet app 165, as a text message, as an email, as a calendar entry, etc.

The calendar data 160 also may be communicated to the transaction processor and filter 175 module. The communication or flow back of data may be thought of as feedback data. In some situations, an appointment which may be accepted may not actually occur. In this situation, it may be logical to further understand why the suggested and accepted appointment was not completed which may be indicated by the lack of a transaction during the time of the appointment. In other situations, a recommended transaction may be completed and the fact that a recommended transaction has been completed may be noted by the system to improve future performance of the recommendation system.

At block 220, purchase data may be communicated to the relational database 110. As mentioned previously, the transaction processor and filter 175 may include purchase data such as an amount, a merchant identification, a merchant commerce code, a product category, a location and a purchase intent. Additional data may be included depending on the system, the data available including data from other systems and the permissions of the people in the database.

The relational database 110 may have additional data beyond the data from the transaction processor and filter. At a high level, the relational database 110 may have a calendar database 105, an MCC data base 115 and a user preference database 120. The databases 105, 115 and 120 may be stored in a single relation database server 311 (FIG. 3) or may be in separate database servers as will be described in reference to FIG. 3. In other embodiments, some or all of the databases 105, 115 and 120 may be housed in their own server or a combination of servers.

The system may have a calendar server 306. The calendar server 105 may be a stand-alone device that operates according to an application programming interface (API) where commands are communicated to it in a known format and outputs from the server occur in a known and expected format. In another embodiment, the calendar data 105 is stored in a database such as the relational database 110.

The calendar data 105 may include recurring events; and non-recurring calendar events. The events may be for an individual or may be for a group of individuals. The events may have additional details such as a start time of a calendar entry, an end time of the calendar entry, a location, a task, a repetition schedule and any additional details that may be used to describe the event.

The relational database 110 may operate on a relational database server 311 (FIG. 3) specifically designed to operate database systems. Databases may have different demands than other servers. The processing power and required speed to search vast amounts of data may require that the relational database server 311 have more high speed memory, faster processors and higher speed hard drives than other servers built for other purposes.

The relational database 110 may also include a database of merchant category code or classification (MCC) data 115. A MCC may be a four-digit number listed in ISO 18245 for retail financial services. The number may correspond to the type of business or service the company offers. The MCC data 115 may include MCC data on purchases by an individual or a plurality of individuals. The MCC data 115 may be accessed through traditional database commands. The MCC data 115 may include additional data such as an amount of a purchase, a merchant name for a purchase, a product category, location of the purchase or the merchant and an intent of the purchase.

In other embodiments, the MCC data 115 may be stored in an MCC server 316. The MCC server 316 may be dedicated to storing MCC data 115 for individuals. The MCC server 316 may operate according to APIs which allow for the specific calling of data in a specific format and of receiving data in a specific format. The MCC server 316 may be physically configured to aid the storing and retrieval of MCC data 115.

The relational database 110 may also have a user preference data base 120. The user preference database 120 may contain data on user preferences of one or more individuals such as a profile of user, preferences of a user, and dislikes of user. The profile may also describe the individual characteristics such as a gender selection, an age indication and a location. Of course, additional characteristics may be added as the characteristics are available and sufficient permissions are obtained from the individuals. The characteristics may be used to help classify the individuals and to create a resource of characteristics to review and analyze to make schedule predictions for other individual that may be determined to be similar. The user preferences may be added by a user or may be learned by reviewing transaction data.

Logically, the user preference database 120 may be stored in an user preference server 321. The user preference server 321 may be physically configured to make access, storage and retrieval of user preference data 120 especially easy and efficient. For example, the memory on the preference database may be of a higher speed to enable faster response to detailed queries of user preference data.

At block 225, the data from the relational database 110 such as the calendar data base 105 information, the MCC database information 115 and the user preference database 120 may be communicated to concierge system 125. Logically, if the data is held in servers such as the calendar data server 306, the MCC data base server 316 or the user preference data base server 321, the data will be communicated from the servers 306, 316, 321.

At block 230, the calendar data 105, MCC data 115 and user preference data 120 data may be analyzed. The data 105, 115 and 120 may proceed through a variety of analysis algorithms. The system may also have a concierge engine 125. The concierge engine 125 may take in a large amount of data and make recommendations to a user based on an analysis of the data. The concierge engine may be a specific server 326 built to be the concierge engine with physical aspects to aid in the processing required. In other embodiments, the concierge engine 125 may be part of another server.

The concierge engine 125 may have a variety of aspects and forms. The concierge engine may be a concierge server 326 specifically designed to execute concierge aspects and functions. The concierge logic 130, population and similars processing 135 and recommendation engine 140 may reside and may be physically embodied in the concierge server 326. In another embodiment, concierge logic 130, population and similars processing 135 and recommendation engine 140 may each have their own servers (or a combination of servers) such as a concierge logic server 331, population and similars processing server 336 and recommendation server 341.

Concierge Logic

An aspect of the concierge engine 125 may be concierge logic 130. Concierge logic may include an algorithm to determine conflicts in scheduling. Logically, the concierge logic 130 may attempt to provide a recommendation that does not conflict with currently scheduled items or items which can be easily anticipated. Currently scheduled events may be analyzed and the system may attempt to avoid scheduling events during currently scheduled times.

The concierge logic 130 may include an algorithm to determine a prioritization among options. On many occasions, there may be a variety of options for recommending an event time and a priority algorithm may be used to rank the options. The priority may be based on a variety of factors and weights which may be adjusted by a user or may be adjusted by algorithm which may be a learning algorithm which analyses past situations and user responses and adjusts the algorithm based on those responses. For example, calendar events which are work related may have a first priority and recreational events may have a second priority. The priorities may be analyzed to determine a recommendation. The priorities may also adjust according to the days of the week or the time of the day.

Concierge logic 130 may include an algorithm to determine likelihood of events using Bayesian logic. Bayesian logic may be able use probabilities to predict how people would act in the face of similar circumstances. More specifically, the logic may determine the probability of an event, based on prior knowledge of conditions that might be related to the event. By studying events and the response of people to those events, patterns and predictions may be learned by studying a large number of events and responses. In one aspect, the events may be determined that have a significant impact on responses. In addition, responses to events may be analyzed to determine patterns and predictions based on events.

The collected data may be used to assist in creating the Bayesian logic. As a simplistic example, people that rent cars often purchase fuel in the next couple days. By evaluating when the user checks out of a hotel or comes close to a car return location (facts), the system may determine that based on previous experience, the user will likely need to obtain fuel soon. The system may communicate nearby fuel stations and best prices to the user.

Similars

In one embodiment, an algorithm in the concierge engine 125 or similar processor 326 may performs a clustering analysis using clustering logic 130 to determine similar people and the similar people may be used to make predictions for an individual. The clustering algorithm may be a learning algorithm and it may be embodied in a clustering server or may be part of the concierge server.

The clustering algorithm may attempt to cluster together individuals that act similarly when faced with similar facts. In some embodiments, the algorithm may be simple like a similars processing 135 such as locating people in a similar age group, living in a similar location and that buy similar items and determine their purchase patterns. In another embodiment, the algorithm may be more complex such as where a plurality of data elements on individuals is studied and the elements which are determined to be most relevant to future events may be identified and use to predict upcoming events that may need to be scheduled.

In another aspect, trend analysis may be used to identify recurring events that would permit "scheduling ahead" for a predetermined number of occurrences. At a high level, trend analysis refers to techniques for extracting an underlying pattern of behavior over time which may be used to predict events in the future. Algorithms may be used to review past data with the goal of locating trends in the data. The trends may then be used to predict future events. An example may be a student that pays tuition at a college. If the student makes two tuition payments in one year, the trend analysis may assume the student will complete their college studies in four years which would mean that six more tuition payments (two per year for three more years) may be scheduled in the future and then the tuition payments may end.

Recommendation Engine

A recommendation engine 140 may receive the data from the similars processor 135 or similars server 336 and may use the clustering analysis and recurrent machine learning to create a schedule recommendation to a user. The recommendation engine may use a learning algorithm to review the data from the concierge logic 130 and from the similars processing 135 to determine recommendations most likely to be accepted by the user.

The learning algorithm in the recommendation engine 140 or recommendation server 341 may also receive the decision from a user at block 147 whether the recommendation was accepted as acceptance feedback. The acceptance feedback may be useful to help train the learning algorithm with the information whether the recommendation was accepted or rejected.

Learning algorithms often take sets of data and break them into parts. One part of the data is used to train an algorithm and the remainder of the data is used to test the resulting algorithm. Then another part of the original data set is used to test the algorithm while the remaining data is used to train the algorithm. The process continues until all the data has been used to both train and test the algorithm. As an example, a set of data may include a plurality of purchases. The algorithm may be tuned to identify factors that may result in purchases for hotels. The set of data may be broken into four sets. The first set may be used to test the algorithm and the second, third and fourth set may be used to train the algorithm The training may take on a variety of forms but at a high level, the training algorithm may attempt to use a least squares analysis to find the best equation to fit the data to an equation to represent the data. The resulting algorithm from the second, third and fourth set of data may be tested using the first set of data and the error may be noted. Next, the sets may switch and the second set of data may be the test data and the first, third and fourth data sets may be the training data. Again, the resulting algorithm may be tested and the error may be noted. The rotation of the sets may continue until each of the four sets have been used to test the algorithm and the algorithm with the lowest error may be used to make predictions regarding hotel purchases.

At block 235, the recommendation 145 from the recommendation engine 140 may be communicated to the user. In some embodiments, the recommendation 145 may be converted into an electronic format 145 such as an email message or text message or pop-up display. In other embodiments, the recommendation 145 may be formatted as an email message or text message pop-up display. In yet additional embodiments, the recommendation 145 may be communicated as a calendar invitation. The format may be selected by a user or may be dependent on the type of computing device that is available to the user. For example, if the user is a heavy electronic calendar user, the message may be more likely to be communicated as a calendar invitation. At block 240, the recommendation may be communicated to the user.

Figure 4:
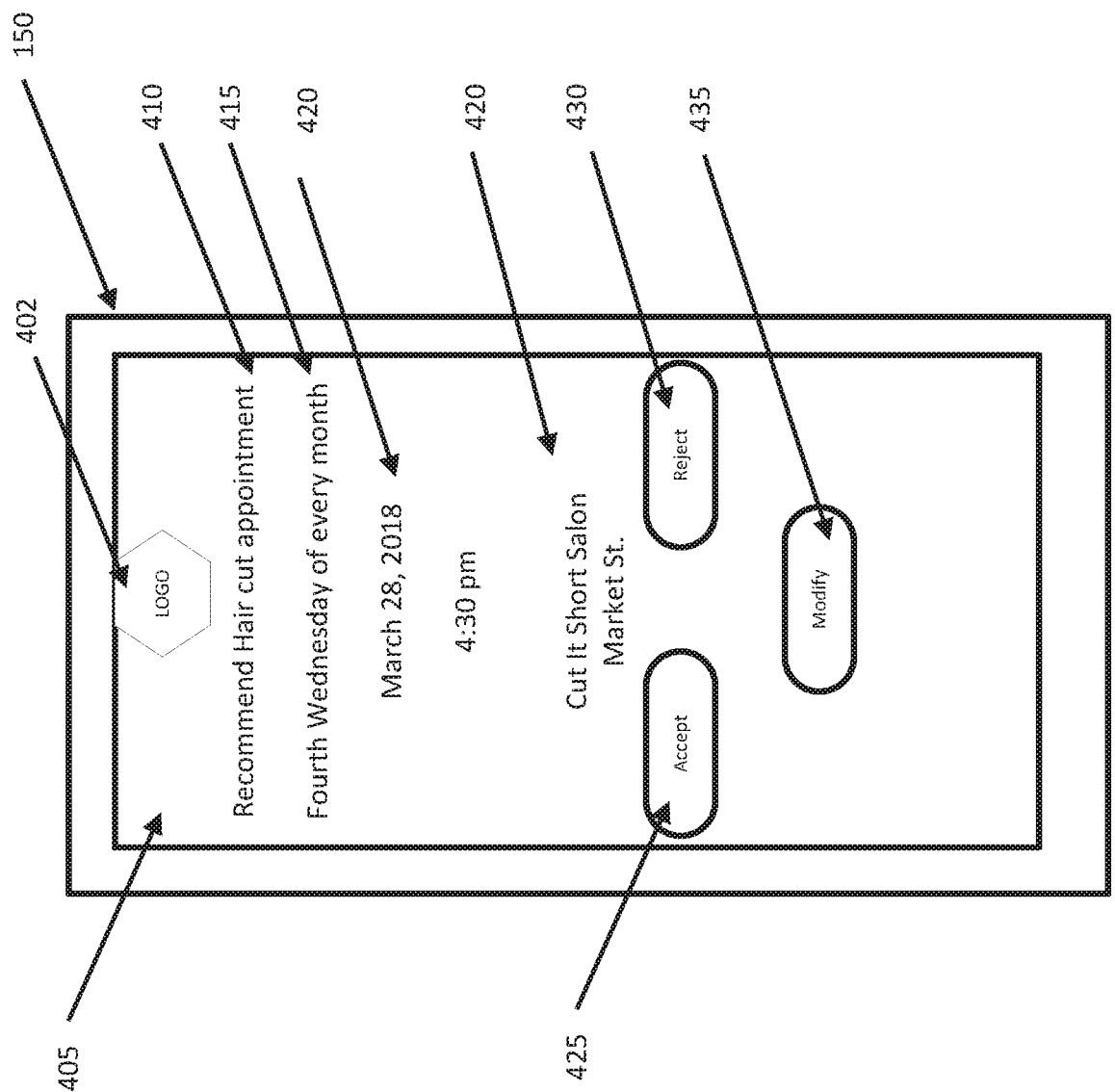
FIG. 4 may be an illustration of a user interface in accordance with the claims.

FIG. 4 may illustrate a sample recommendation 145 that may be communicated to a personal computing device 150 of a user. Logically, the personal computing device 150 may have a display 405. As mentioned previously, the form of the communication of the recommendation 150 may vary. The form may be set by a vendor 402, or by the user, or may be set as a preference by a user or the system may learn by observing the use of the user and creating a communication of the recommendation 150 which is most likely to evoke a response from the user.

In one embodiment, the recommendation 150 may include a subject 410, a rational for the recommendation 415, a date and time for the recommendation 420 and a location 420 suggestion. As mentioned previously, the recommendation 150 may be accepted 425, rejected 430 or modified 435. Additional user interfaces (not shown) may be created which may illustrate how the recommendation fits into the calendar of the user or how the recommendation integrates with other application on the portable computing device.

In some situations, the user may have the option 147 to accept, modify or reject the calendar recommendation. Logically, the electronic computing device 150 may be a smart phone 150 or a smart wearable device. The portable computing device 150 may have a processor 155 that may be physically configured to execute one or more calendar applications 160. The calendar application 160 may track events and may include whether a time is free or full. It also my keep track of holidays or work events for the user, for others or for the entire firm. In addition, the portable computing device 150 may have a wallet application 165 of other payment application 165 which may be used to enable transactions and may provide data to the payment system 170 and the transaction payment filter server 175.

Logically, if the recommendation 145 is accepted, it may be added to the portable computing device of the user in one or more applications. In one embodiment, the recommendation 145 may be a calendar entry. In other embodiments, the recommendation 145 may be a note to the user. In yet another embodiment, a wallet application 165 may have the ability to provide a notification 145 to a user. Of course, the notification 145 may appear in other applications or other formats.

The wallet application 165 may be enabled to represent one or more payment accounts of the user. The user may add the payment accounts to the wallet application and the payment accounts may appear as options to be used to make a payment. Once an account is selected, the wallet application may use a token which represents a personal account number (PAN) but is not the PAN itself. The token may be communicate to a token server (not shown) where the token may be translated in the PAN in a secure environment. The wallet application may be able to obtain additional data than a traditional credit card transaction and this additional data may be useful in the system.

The acceptance or rejection of the recommendation 145 may also be communicated to a scheduling system 185 which may accept the scheduled data and may communicated it to merchant appointment/scheduling systems 190 which may track appointment registration input at the merchant. Further, the schedule data 185 may be communicated to the calendar 160 of the user on the portable computing device 150.

The acceptance of the recommendation 145 may also be communicated from the scheduling system 185 to a merchant scheduling system 190. Logically, some recommendations 145 may be for goods or services that are provided by a vendor. By letting the vendor know that a recommended appointment has been accepted, the merchant can prepare the good or service in time to be provided to the user. In some embodiments, the merchant may also be able to communicate messages to the user such as "Thank you" or "See you soon!".

Finally, the accepted recommendation also may be communicated to a calendar application 160 in the portable computing device 150. As mentioned previously, the acceptance may be communicated in a variety of formats to a variety of applications, including a calendar application.

The transaction processor and filter 175 may communicate an intent communication 193 which may be a text or email to the processor which may contain a who, a what and a when of a transaction. The intent may act like a receipt 193. In some embodiments, the receipt 193 may be communicated to a central receipt server (not shown) which may create, store and communicate receipts. The user may be informed of the details of the good or service purchased. Similarly, the purchase data may flow from the processor 155 to the transaction processor and filter 175 to verify the details of a transaction.

As noted, a variety of application programming interfaces (APIs) may be used to create reliable and efficient communication among the various elements of the system. For example, the payment system may operate according to a set of known APIs. Similarly, at each step of the method where data is communicated, the data may be communicated according to an API. As an example, the concierge engine may receive and communicate data according to a known set of rules and formats such as an API. The data may be received in a known format and may be added to the concierge logic 130, similars processing 135 and the recommendation engine 140 as appropriate.

Similarly, if a recommendation 145 is desired, a message may be communicated to the concierge engine 125 that a recommendation 145 is requested. The concierge engine 125 may receive the message which may contain data in a known and expected format, may execute the recommendation engine 140 and may return a recommended service date and the recommendation in a known and expected format.

In one example, a user may pay for a hair-cut using a mobile wallet 165 on a personal computing device 150. The transaction may proceed through the payment system 170 and the transaction processor 175. The key information may be extracted from the transaction processor and it may be added to the calendar data base 105, the MCC data base 115 and the user preference database 120. The transaction data may then be communicated from the relational database 110 to the concierge engine 125 where the transaction may be added to the pool of data that is analyzed. Some of the transaction data may be provided back to the user as a receipt. In addition, the recommendation engine 140 may review the transaction. The concierge engine 125 may note that the transaction matches a pattern in that a user or similar people often get their hair cut on a periodic basis. The calendar of the user may be analyzed and a priority of activities may be determined. The recommendation engine 140 may determine an optimal scheduled time to recommend for a hair cut in the future. The recommendation 145 may be communicated to a user in a variety of ways, such as a text, an email, an app or through a wallet app. The user may be able to accept, reject or modify the recommendation 145. If the recommendation 145 is accepted, the event may be added to the portable computing device 150 such as in a calendar app. In addition, the service provider may be notified that an appointment has been made in the future. Finally, the system may monitor the appointment to see that it actually occurs and this data may be added to the system to improve future performance.

In another example, a user may have rated a previous purchase. The user may begin the process of purchasing the same or a similar item such as through a wallet application 165. The proposed purchase may be submitted to the concierge engine 125. The concierge engine 125 may respond with a recommendation 145 on whether to purchase the product or service or to select another good or service.

In another aspect, the concierge service may aggregate data on returns or ratings from users. The aggregate data on product returns to a merchant may be used for generating purchase recommendations and providing purchase warnings. The recommendations even may have text that notes the reviews, an average review score, and return issues or an high recommendations from other users.

In yet another example, the concierge engine 125 may note re-current patterns of purchases such as monthly lunches with friends or business deals. The concierge engine 125 may analyze the meetings and may determine likely dates in the future for similar meetings where there are no conflicts. The concierge application 125 may then issue a recommendation to the user to schedule one or more future events based on the pattern of past events.

Figure 5:
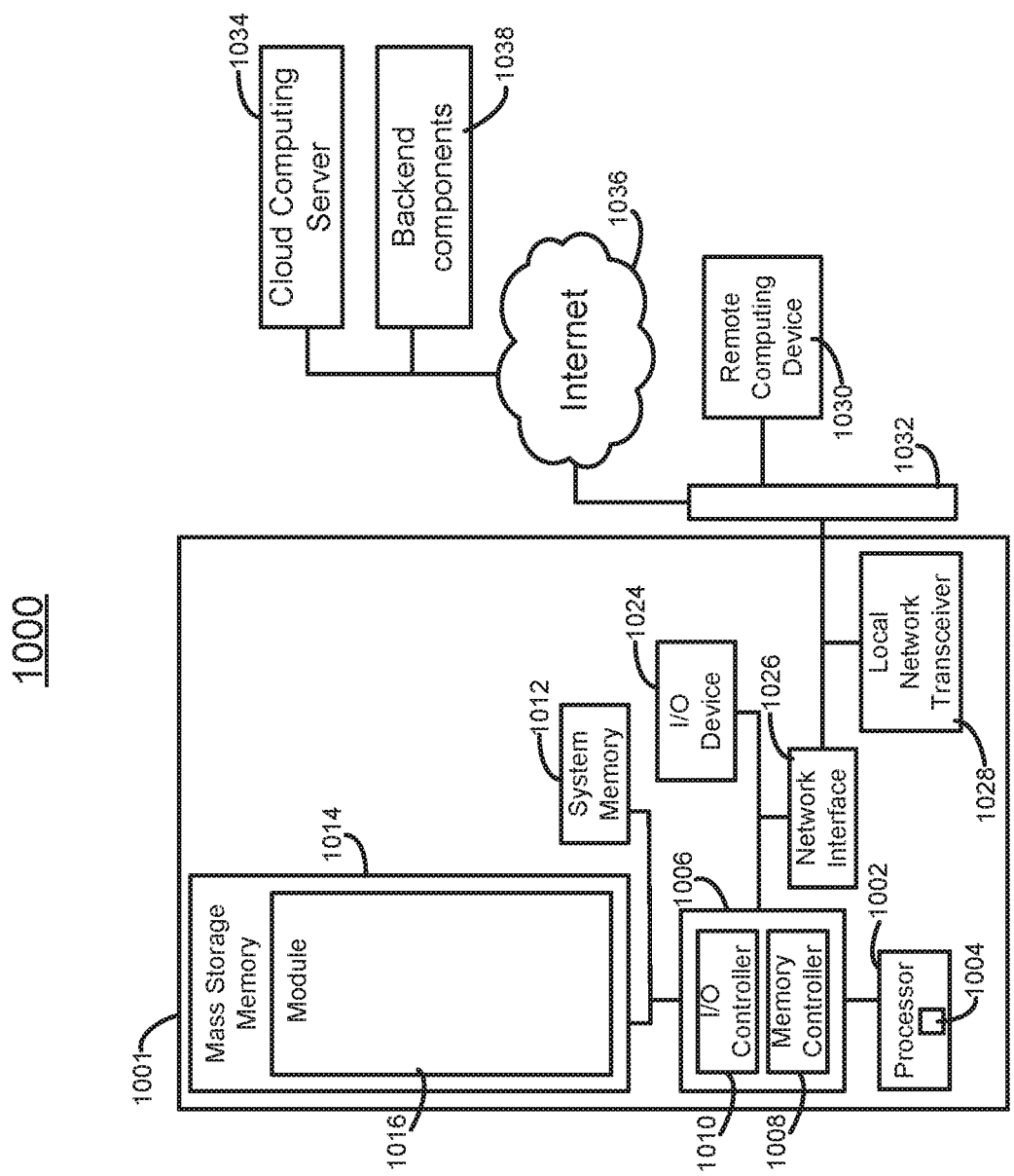
FIG. 5 may be an illustration of the computing environment.

FIG. 5 is a high-level block diagram of an example computing environment 1000 for the system 100 (FIG. 1) and method 200 (FIG. 2) for a concierge, as described herein. The computing device 1001 may include a server (e.g., the payment processing server 114, a mobile computing device (e.g., user computing device 106), a cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example systems and methods described herein may be used to implement and execute the example systems of FIG. 1 and methods of FIGS. 3A and 3B. Although the example system 1000 is described below as including a plurality of peripherals, interfaces, chips, memories, etc., one or more of those elements may be omitted from other example processor systems used to implement and execute the example systems and methods. Also, other components may be added.

As shown in FIG. 5, the computing device 1001 includes a processor 1002 that is coupled to an interconnection bus. The processor 1002 includes a register set or register space 1004, which is depicted in FIG. 5 as being entirely on-chip, but which could alternatively be located entirely or partially off-chip and directly coupled to the processor 1002 via dedicated electrical connections and/or via the interconnection bus. The processor 1002 may be any suitable processor, processing unit or microprocessor. Although not shown in FIG. 5, the computing device 1001 may be a multi-processor device and, thus, may include one or more additional processors that are identical or similar to the processor 1002 and that are communicatively coupled to the interconnection bus.

The processor 1002 of FIG. 5 is coupled to a chipset 1006, which includes a memory controller 1008 and a peripheral input/output (I/O) controller 1010. As is well known, a chipset typically provides I/O and memory management functions as well as a plurality of general purpose and/or special purpose registers, timers, etc. that are accessible or used by one or more processors coupled to the chipset 1006. The memory controller 1008 performs functions that enable the processor 1002 (or processors if there are multiple processors) to access a system memory 1012 and a mass storage memory 1014, that may include either or both of an in-memory cache (e.g., a cache within the memory 1012) or an on-disk cache (e.g., a cache within the mass storage memory 1014).

The system memory 1012 may include any desired type of volatile and/or non-volatile memory such as, for example, static random access memory (SRAM), dynamic random access memory (DRAM), flash memory, read-only memory (ROM), etc. The mass storage memory 1014 may include any desired type of mass storage device. For example, the computing device 1001 may be used to implement a module 1016 (e.g., the various modules as herein described). The mass storage memory 1014 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 1001, the system 100, and method 300. Thus, a module, block, function, operation, procedure, routine, step, and method can be implemented in hardware, firmware, and/or software. In one embodiment, program modules and routines are stored in mass storage memory 1014, loaded into system memory 1012, and executed by a processor 1002 or can be provided from computer program products that are stored in tangible computer-readable storage mediums (e.g. RAM, hard disk, optical/magnetic media, etc.).

The peripheral I/O controller 1010 performs functions that enable the processor 1002 to communicate with a peripheral input/output (I/O) device 1024, a network interface 1026, a local network transceiver 1028, (via the network interface 1026) via a peripheral I/O bus. The I/O device 1024 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 1024 may be used with the module 1016, etc., to receive data from the transceiver 1028, send the data to the components of the system 100, and perform any operations related to the methods as described herein.

The local network transceiver 1028 may include support for a Wi-Fi network, Bluetooth, Infrared, cellular, or other wireless data transmission protocols. In other embodiments, one element may simultaneously support each of the various wireless protocols employed by the computing device 1001. For example, a software-defined radio may be able to support multiple protocols via downloadable instructions. In operation, the computing device 1001 may be able to periodically poll for visible wireless network transmitters (both cellular and local network) on a periodic basis. Such polling may be possible even while normal wireless traffic is being supported on the computing device 1001. The network interface 1026 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 1008 and the I/O controller 1010 are depicted in FIG. 5 as separate functional blocks within the chipset 1006, the functions performed by these blocks may be integrated within a single integrated circuit or may be implemented using two or more separate integrated circuits. The computing environment 1000 may also implement the module 1016 on a remote computing device 1030. The remote computing device 1030 may communicate with the computing device 1001 over an Ethernet link 1032. In some embodiments, the module 1016 may be retrieved by the computing device 1001 from a cloud computing server 1034 via the Internet 1036. When using the cloud computing server 1034, the retrieved module 1016 may be programmatically linked with the computing device 1001. The module 1016 may be a collection of various software platforms including artificial intelligence software and document creation software or may also be a Java® applet executing within a Java® Virtual Machine (JVM) environment resident in the computing device 1001 or the remote computing device 1030. The module 1016 may also be a "plug-in" adapted to execute in a web-browser located on the computing devices 1001 and 1030. In some embodiments, the module 1016 may communicate with back end components 1038 via the Internet 1036.

The system 1000 may include but is not limited to any combination of a LAN, a MAN, a WAN, a mobile, a wired or wireless network, a private network, or a virtual private network. Moreover, while only one remote computing device 1030 is illustrated in FIG. 5 to simplify and clarify the description, it is understood that any number of client computers are supported and can be in communication within the system 1000.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer based system for providing a schedule recommendation to a user comprising:
 a transaction processor and filter server that receives purchase data associated with purchases made by the user from a payment system via an application programming interface (API), the transaction processor and filter being configured to review and extract useful data from the purchase data for making schedule recommendations, the useful data including transaction amounts, merchant identifications, merchant category codes, merchant locations, product categories, and transaction intents;
 a relational database server that receives the useful data from the transaction processor and filter server via an API, the relational database server comprising:
  a calendar server that stores calendar data for the user;
  a merchant category code database server that stores merchant category code (mcc) data including the transaction amounts, the merchant identifications, the merchant category codes, the merchant locations, the product categories, and the transaction intents for the user; and
  a user preference server that stores user preference data for the user; and
 a concierge processor that receives the calendar data, the mcc data, and the user preference data from the relational database server via an API, the concierge processor being configured according to computer-executable instructions for executing a machine learning algorithm on the calendar data, the mcc data, and the user preference data to make a schedule recommendation for the user, wherein the machine learning algorithm is a clustering analysis algorithm, and wherein the clustering analysis algorithm clusters similar individuals with similar purchase patterns and uses the cluster of similar individuals in making the schedule recommendation for the user; and communicating the schedule recommendation to a personal computing device of the user via an application programming interface.

2. The system of claim 1, wherein the user preference data comprises:
a profile of the user;
preferences of the user; and
dislikes of the user.

3. The system of claim 1, wherein the profile of the user further comprises:
a gender selection;
an age indication; and
a location.

4. The system of claim 1, wherein the concierge processor comprises:
concierge logic;
population and similars processing; and
a recommendation engine.

5. The computer system of claim 4, wherein the concierge logic comprises:
an algorithm to determine conflict;
an algorithm to determine a prioritization among options; and
an algorithm to determine likelihood of events using Bayesian logic.

6. The computer system of claim 5, wherein the population and similars processing performs the clustering analysis algorithm.

7. The system of claim 1, wherein the transaction processor and filter executes an algorithm to determine the mmc data, and wherein the mcc data is communicated to the mcc database server.

8. The system of claim 1, further comprising a wallet application on a portable computing device which communicates the purchase data to the payment system.

9. A computer-implemented method for providing a schedule recommendation to a user comprising:
receiving, at a transaction processor and filter server, purchase data associated with purchases made by the user from a payment system via an application programming interface (API);
at the transaction processor and filter server, reviewing and extracting useful data from the purchase data for making schedule recommendations, the useful data including transaction amounts, merchant identifications, merchant category codes, merchant locations, product categories, and transaction intents;
receiving, at a relational database server, the useful data from the transaction processor and filter server via an API, calendar data, and user preference data, the relational database server including a calendar server that stores the calendar data, a merchant category code (mcc) database server that stores mcc data including the useful data, and a user preference server that stores the user preference data;
receiving, at a concierge processor, the calendar data, the mcc data, and the user preference data from the relational database server via an API;
at the concierge processor, executing a machine learning algorithm on the calendar data, the mcc data, and the user preference data to make a schedule recommendation for the user, wherein the machine learning algorithm is a clustering analysis algorithm, and wherein the clustering analysis algorithm clusters similar individuals with similar purchase patterns and uses the cluster of similar individuals in making the schedule recommendation for the user; and
communicating the schedule recommendation to a personal computing device of the user via an application programming interface.

10. The method of claim 9, wherein the calendar data comprises:
recurring events; and
non recurring events.

11. The method of claim 9, wherein the user preference data comprises:
a profile of the user;
preferences of the user; and
dislikes of the user.

12. The method of claim 11, wherein the profile of the user comprises:
a gender selection;
an age indication; and
a location.

13. The method of claim 9, wherein the concierge processor comprises:
concierge logic;
population and similar processing; and
a recommendation engine.

14. The method of claim 13, wherein the concierge logic comprises:
an algorithm to determine conflict;
an algorithm to determine a prioritization among options; and
an algorithm to determine likelihood of events using Bayesian logic.

15. The method of claim 13, wherein the population and similars processing performs the clustering analysis algorithm.

16. The method of claim 9, further comprising:
receiving a selection from the portable computing device to accept or reject the schedule recommendation; and
communicating the selection to a schedule server.

17. The method of claim 16, further comprising communicating the selection to a schedule server:
adding the selection to a schedule of a merchant; and
adding the selection to a schedule of the user.

18. The system of claim 1, wherein the purchase data includes purchase receipts.

* * * * *